United States Patent Office 3,443,795
Patented May 13, 1969

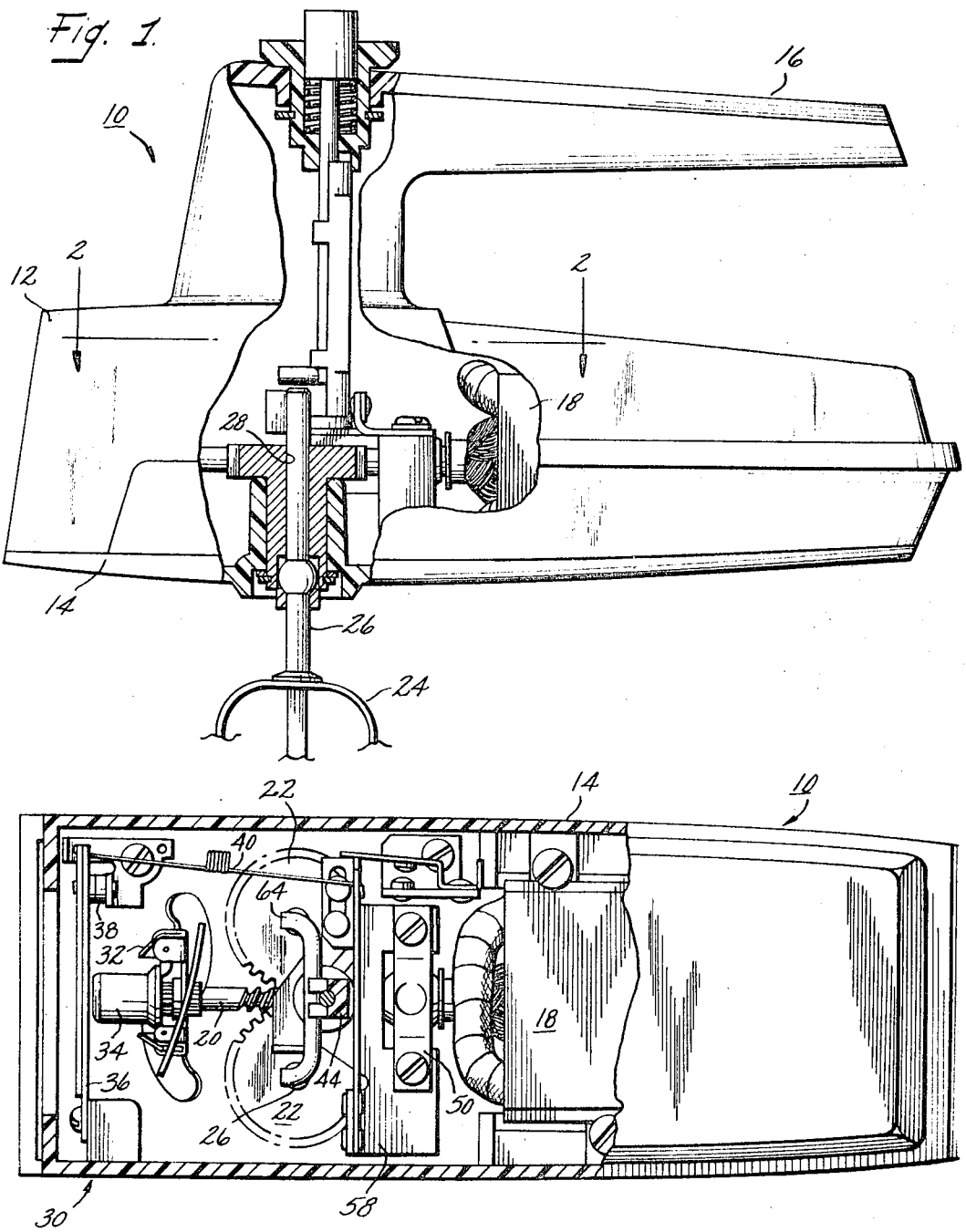

3,443,795
BEATER EJECTOR FOR FOOD MIXER
Robert I. Gresens, Rochester, and Stephen M. Sackmary, Spencerport, N.Y., assignors to General Electric Company, a corporation of New York
Filed Aug. 15, 1967, Ser. No. 660,628
Int. Cl. B01f 7/04, 15/02
U.S. Cl. 259—1                                        10 Claims

ABSTRACT OF THE DISCLOSURE

The disclosure herein shows an improved beater ejector mechanism for a food mixer with novel structure to prevent ejection of the beaters when the mixer is in operation.

BACKGROUND OF THE INVENTION

Field of the invention

The invention herein pertains to a beater ejector mechanism for a food mixer and, more particularly, to a novel ejector mechanism using structure common to the speed control to prevent beater ejection during mixer operation.

Description of the prior art

In the small appliance field, and especially in portable food mixers, it is desirable to have the various control units as convenient as possible for the user for operation of the mixer by either hand. There are two main controls that govern the operation of the mixer and these are the speed control and the beater ejector mechanism. It is desirable to provide both controls operable conveniently from either side of the mixer by the hand of the user when holding the mixer. Thus, a concentric and centrally disposed arrangement is used. This comprises a speed control knob centrally disposed on the handle at the top with an inner ejector knob so that either a right or left handed person can control the speed knob with his index finger and eject the beaters with his thumb. In addition, it is necessary that the beaters not be ejected while the mixer is in operation for safety purposes. Numerous concentric and other arrangements have been provided but these have generally required separate operation and the speed control must be turned off with the thumb and forefinger before the beaters can be ejected by a central knob. Various interlocks have been provided to prevent ejection during operation. A typical structure of two modifications is shown in U.S. Patent 2,737,371 of common assignment. However, some of these structures result in complex linkages. Because of the constant need for simplified structure to reduce costs and provide safety, it is desired to use as much of the speed control and the ejector mechanism in common as possible to perform dual functions and it is to this end that the present invention is directed.

SUMMARY OF THE INVENTION

Briefly described, the present invention is directed to a food mixer of the type that has a casing which includes a handle and an upright support for the handle generally at the forward portion of the mixer. A power unit in the casing drives a spindle which drives a pair of adjacent gears on each side of the spindle. The gears are provided with apertures that are centrally disposed to receive at least a pair of beaters having shafts extending through the apertures. The beaters are retained in the gears by suitable mechanism well-known in the art as shown in the referenced 371 patent. In this structure an improved ejector mechanism is provided which comprises a bracket that is supported in the casing and extends over the gears. A generally vertical and upwardly extending rotatable and preferably hollow shaft is supported by the bracket parallel with the beater shafts and preferably equally spaced from the beater shafts. In a pair of shafts it is thus midway between the shafts. The rotatable shaft is provided with a switch control cam on one end adjacent and above the bracket and is supported in the bracket and against axial movement by this cam which also operates an on-off switch and speed control for the mixer. The cam thus limits downward movement of the rotatable shaft because of its support on the bracket. To this structure there is provided an ejector shaft that is fixedly supported on the rotatable shaft so that it rotates with the rotatable shaft and is slidable axially of the shaft. This is conveniently arranged when the shafts are concentric but is not limited to a concentric arrangement. The ejector shaft is provided on one end with a cross bar that may be in the shape of a U with the legs of the cross bar overlying the apertures for ejection of the beater shafts. The bracket is provided with upwardly extending stop means on each side of the rotatable shaft to form a channel between the stop means to receive the cross bar. A biasing means, such as a spring, is provided at the other end of the ejector shaft to bias the bar upwardly and away from the apertures. Thus, the cross bar is depressed axially of the rotatable shaft into the channel to contact the beater shafts and eject the beaters when the rotatable supporting shaft is in a switch open position. Furthermore, the stops prevent reception of the bar in the channel when the rotatable shaft is in other than switch open position. The switch control cam means on the rotatable shaft is disposed below the cross bar to limit the bar movement into the channel. The hollow form of rotatable shaft has stop means above the bar to retain the ejector shaft in the hollow shaft and the stop means are disposed in the path of axial travel of the bar to limit the bar movement out of the channel by the biasing means. Thus, the main object is to provide simple ejector mechanism that uses structure common to the speed control and prevents beater ejection when the mixer is running.

BRIEF DESCRIPTION OF THE DRAWING

FIG. 1 is an elevational side view partially broken away to illustrate a food mixer with the invention;

FIG. 2 is a partial top sectional view on the line 2—2 of FIG. 1;

DESCRIPTION OF THE PREFERRED EMBODIMENT

Figure 3:
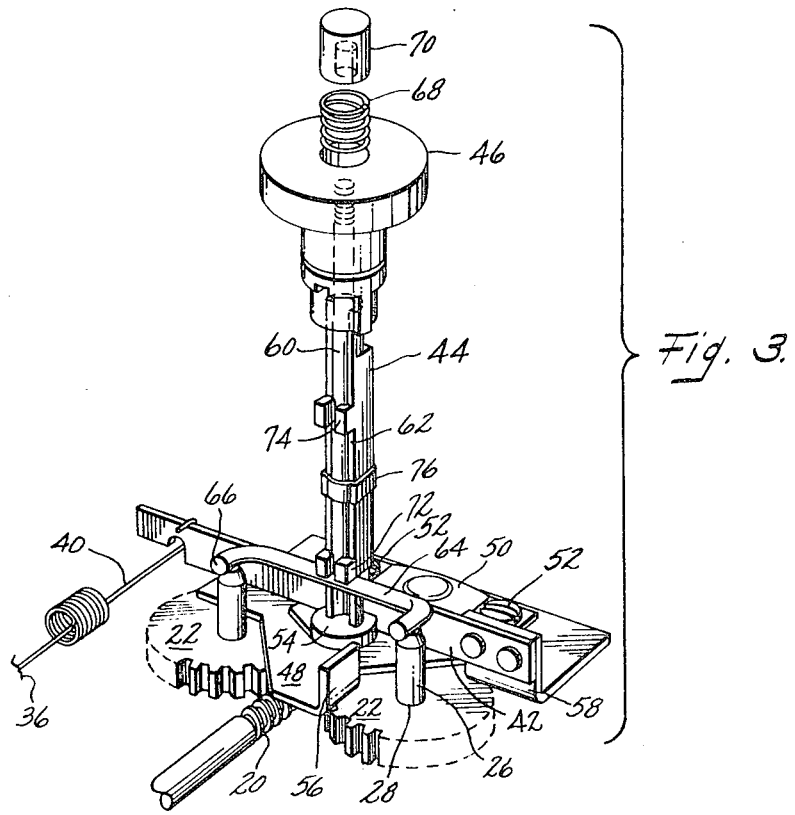
FIG. 3 is a perspective view of the ejector mechanism showing some parts in an exploded position.

Referring first to FIGS. 1 and 2, there is shown a food mixer indicated at 10 that is generally made up of two mating casings 12 and 14 for convenience. Upper casing 12 is provided with a handle 16 and the mixer is designed to be tilted on its handle when not in use. In order to operate the mixer, there is provided a power unit 18 that drives the spindle 20 extending between a pair of adjacent gears 22. For purposes of description herein, a mechanism that is used with a pair of beaters 24 will be described although it will be apparent that it is not limited to two beaters. The beaters 24 are provided with beater shafts 26 of suitable length for ejection purposes. Each of the gears 22 has an aperture 28 centrally thereof which receives shafts 26 therethrough and the beater shafts 26 are held in position in the mixer by suitable means as shown in the aforementioned patent.

In order to provide a mechanism whereby the beaters cannot be ejected while the mixer is in operation, the invention herein is directed to an improvement in the ejector mechanism. In such a food mixer, it is customary to have a governor mechanism generally indicated at 30 in FIG. 2. This usually comprises a flyweight mechanism 32 that operates through actuator cap 34 which actuates an arm 36 to operate contact 38 to make and break the electrical circuit and control the speed in a generally known manner. Different speeds are provided as seen in FIG. 3 by varying a spring force on arm 36 by means of spring 40 that is connected to a resilient cam follower 42 which, in the present invention, also operates as a stop as will become apparent. The governor mechanism just described is generally known except as it may form part of the present ejector mechanism. In this governor mechanism it is necessary to have a speed control shaft 44 that is rotated by knob 46 to vary the speed by changing the spring force on arm 36. The shaft 44 is generally parallel with beater shafts 26 so that it preferably extends vertically to the plane of rotation of gears 22 and upwards through the handle 16 and is rotatable at the top front of the handle as seen in FIG. 1. Support for the rotatable shaft 44 is provided by means of a bracket 48 that is supported within the casing conveniently as part of the bearing structure 50 for one end of the power unit. The whole bracket and bearing structure may be secured to suitable bosses in the casing (not shown) by single screws 52. Bracket 48 is shaped to extend over the gear 22 as shown in FIG. 3 and it forms the bottom support for the rotatable speed control shaft 44. The support in the bracket is provided by a switch control cam 54 on one end adjacent and above the bracket as shown. The cam is designed to anchor the shaft 44 in the bracket and limit axial movement of rotatable shaft 44.

For part of the ejection mechanism, bracket 48 is provided with upwardly extending stop means 56 and 58 on opposite sides of shaft 44 and these may be conveniently upturned ears formed in the bracket. The stop means 58 is used to secure the cantilever supported cam follower 42 which extends generally at right angles to bracket 48 so that, in effect, stop means 58 is extended completely across the bracket by means of cam follower 42. Thus, the upwardly extending stop means 56 and 58–42 form a channel into which the ejector cross bar may be depressed as will become apparent.

For one hand operation, there is provided an ejector shaft 60 that is fixedly supported on rotatable shaft 44 so that it rotates with shaft 44 as the shaft is turned by speed control knob 46. In order for the two shafts to turn together any suitable arrangement may be provided but it is convenient to make shaft 44 with a flattened forward portion 62. The ejector shaft 60 is provided with a cross bar 64 that is conveniently in the form of a U with the legs 66 overlying apertures 28 for contact with the beater shafts 26. Cross bar 64 may bear against flat portion 62 and thereby provides for the fixed rotation of shafts 60 and 44 together.

It is important to note that ejector shaft 60 is shorter than control shaft 44 so that cross bar 64 is disposed above the bracket 48 and cam 54 as shown in FIG. 3 and this position is maintained by spring 68 on the other end of the ejector shaft 60 and acting between shaft 44 and ejector control knob 70 which is firmly attached to ejector shaft 60 with the result that spring 68 biases cross bar 64 upwardly out of the channel and away from apertures 28.

Figure 4:
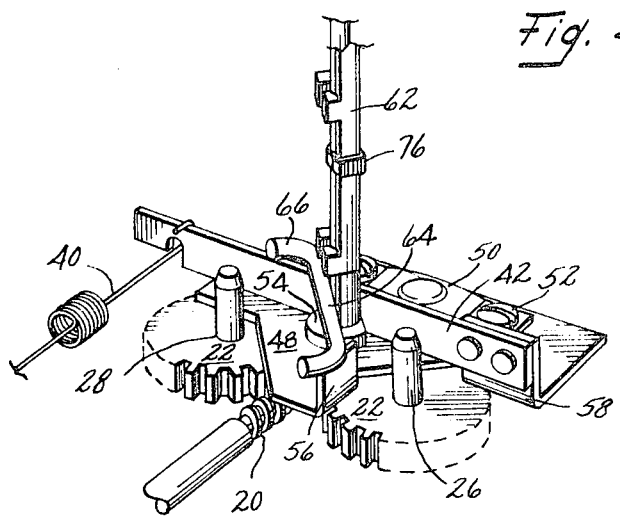
FIG. 4 is a partial view, similar to FIG. 3, showing the ejector bar in a different non-ejecting position against the stops.

By making the ejector shaft 60 shorter than control shaft 44 it will be apparent that, while the shaft 60 is fixedly supported for rotation with shaft 44, there is provision for axial movement of shaft 60 relative to shaft 44. While various mechanical arrangements can be provided for shafts 44 and 60 to rotate together but be axially moveable relative to one another, these motions are conveniently provided by a substantially concentric arrangement as shown where shaft 44 is hollow and shaft 60 is disposed within the hollow control shaft 44. By action of the spring 68 cross bar 64 is maintained in an upward position until ejector control knob 70 is depressed. When this happens, cross bar 64 is permitted to move downwardly into the aforementioned channel between stop means 56 and 58–42 and thereby eject beater shafts 26. In this position, the mixer is in a switch off position under control of cam 54 actuating cam follower 42 to open a circuit control switch not shown. However, when speed control knob 46 is rotated to start the power unit and operate the food mixer, it will be apparent that cross bar 64 under biasing means 68 is in its upward position and bar 64 must rotate with shaft 44 into another position as shown in FIG. 4. However, once shaft 44 has been rotated it will be apparent that the arms of bar 64 then overlie stop 56 as shown in FIG. 4 as well as follower 42 (now acting as a stop) so that the cross bar 64 cannot be depressed. This is the switch on and other operating positions of the mixer. Further rotation to increase the speed merely tends to rotate bar 64 farther and it still overlies stop 42 so that it cannot be depressed. The only way the ejector mechanism may be depressed is by returning the speed control shaft 44 to its switch open position whereby bar 64, by rotating with shaft 44, is then back in position off the stops to be depressed into the channel between stops 56 and 58.

The two shafts 44 and 60 may be conveniently held together by means of stop means 72 above bar 64 which stop means may be part of shaft 44 and flexible so that ejector shaft 60 may be snapped within shaft 44 to be retained therein by stop means 72 and additional stop means 74 and clamp 76 if necessary. By disposing stop means 72 in the path of axial movement of the bar 64 the stop means 72 performs the dual function of retention of the concentric shafts as well as an upward limiting stop for bar 64 as urged by spring 68. It will be apparent that the switch control means that operates the power unit is actuated by cam 54 which serves the additional purpose of supporting and limiting axial movement of shaft 44 as well as limiting downward movement of bar 64 into the channel between stops 56 and 58.

The ejector mechanism described provides for safety by preventing ejection of the beaters when the mixer is in operation and uses in common much of the speed control mechanism which is present of necessity in the device. A positive ejector mechanism is provided which, due to the movement together of the control and ejector shafts in rotation does not require a complex mechanism since rotation of control knob 46 by the user would almost certainly result in rotation of ejector control knob 70 which is thereby permitted by the present structure. Thus, rotation together is permitted but depression of knob 70 is impossible unless bar 64 falls in the channel between stops 56 and 58 and this can only occur when the mixer is in the off position.

It will be apparent that other modifications that might employ more than two beater shafts may be made by using much of the common control structure as described herein without departing from the scope of the invention as defined in the claims.

We claim:

1. In a food mixer having a power unit including a driven spindle, a pair of adjacent gears on each side of and driven by said spindle, apertures centrally disposed in said gears for receiving beater shafts therethrough, the improvement of ejector mechanism comprising,
   a rotatable shaft parallel with said beater shafts and having a switch control means on one end thereof,
   an ejector shaft fixedly supported on said rotatable shaft for rotation therewith and slidable axially thereof,
   a cross bar on one end of said ejector shaft and spanning said apertures,
   biasing means on the other end of said ejector shaft,
   stop means spaced from each side of said bar forming a channel to receive said bar,
   whereby said bar is depressed axially of said rotatable shaft and into the channel to eject said beaters when said rotatable supporting shaft is in switch open position.

2. Apparatus as described in claim 1 where said rotatable shaft is hollow and is disposed vertically with respect to the plane of rotation of said gears and said ejector shaft is substantially concentric within said hollow shaft.

3. Apparatus as described in claim 1 wherein said switch control means on said rotatable shaft is a cam limiting axial movement of said rotatable shaft and disposed below said cross bar to limit said bar movement into said channel.

4. Apparatus as described in claim 2 wherein said switch control means on said hollow shaft is a cam limiting axial movement of said hollow shaft and disposed below said cross bar to limit said bar movement into said channel, said hollow shaft having stop means thereon above said bar to retain said ejector shaft within said hollow shaft and disposed in the path of axial travel of said bar to limit bar movement out of said channel by said biasing means.

5. Apparatus as described in claim 4 wherein a knob is disposed on said other end of the ejector shaft, and said biasing means comprises a spring acting between said knob and said hollow shaft to bias said bar out of said channel.

6. In a food mixer having a casing including a handle and an upright support for said handle at the forward portion of said mixer, a power unit in said casing including a driven spindle, a pair of adjacent gears on each side of and driven by said spindle, apertures centrally disposed in said gears, a pair of beaters having shafts extending through said apertures and retained therein, the improvement of ejector mechanism comprising, a bracket supported and extending over said gears, a vertically upward extending rotatable shaft supported by said bracket parallel with said beater shafts and equally spaced therefrom and having a switch control cam on one end adjacent and above said bracket, said cam limiting axial movement of said rotatable shaft, an ejector shaft fixedly supported on said rotatable shaft for rotation therewith and slidable axially thereof, a U-shaped cross bar on one end of said ejector shaft, the legs of said U overlying said apertures, means on the other end of said ejector shaft biasing said bar upwardly and away from said apertures, upwardly extending stop means on said bracket on each side of said rotatable shaft forming a channel therebetween to receive said bar, whereby said bar is depressed axially of said rotatable shaft into the channel to eject said beaters when said rotatable supporting shaft is in switch open position, and said stops prevent reception of said bar in said channel when said rotatable shaft is rotated to other operating positions.

7. Apparatus as described in claim 6 where said rotatable shaft is hollow and is disposed vertically with respect to the plane of rotation of said gears and said ejector shaft is substantially concentric within said hollow shaft.

8. Apparatus as described in claim 6 wherein said switch control means on said rotatable shaft is a cam limiting axial movement of said rotatable shaft and disposed below said cross bar to limit said bar movement into said channel.

9. Apparatus as described in claim 7 wherein said switch control means on said hollow shaft is a cam limiting axial movement of said hollow shaft and disposed below said cross bar to limit said bar movement into said channel, said hollow shaft having stop means thereon above said bar to retain said ejector shaft within said hollow shaft and disposed in the path of axial travel of said bar to limit bar movement out of said channel by said biasing means.

10. Apparatus as described in claim 9 wherein a knob is disposed on said other end of the ejector shaft, and said biasing means comprises a spring acting between said knob and said hollow shaft to bias said bar out of said channel.

References Cited

UNITED STATES PATENTS

| 2,605,085 | 7/1952 | Gerry | 259—1 |
| 2,737,371 | 3/1956 | Gerry | 259—1 |

WILLIAM I. PRICE, *Primary Examiner.*